(12) United States Patent
Moen et al.

(10) Patent No.: US 11,280,150 B2
(45) Date of Patent: Mar. 22, 2022

(54) SUBSEA CONTROL SYSTEM

(71) Applicant: Aker Solutions Limited, London (GB)

(72) Inventors: Stig Moen, Jar (NO); Derek Massie, Oslo (NO); Einar Winther-Larssen, Oslo (NO)

(73) Assignee: Aker Solutions Limited, London (GB)

( * ) Notice: Subject to any disclaimer, the term of this patent is extended or adjusted under 35 U.S.C. 154(b) by 0 days.

(21) Appl. No.: 16/621,168

(22) PCT Filed: Jun. 28, 2018

(86) PCT No.: PCT/GB2018/051806
§ 371 (c)(1),
(2) Date: Dec. 10, 2019

(87) PCT Pub. No.: WO2019/002865
PCT Pub. Date: Jan. 3, 2019

(65) Prior Publication Data
US 2020/0190931 A1    Jun. 18, 2020

(30) Foreign Application Priority Data

Jun. 30, 2017  (GB) .................................... 1710523

(51) Int. Cl.
| | |
|---|---|
| *E21B 33/035* | (2006.01) |
| *E21B 47/12* | (2012.01) |
| *H04L 12/28* | (2006.01) |
| *H04L 12/42* | (2006.01) |
| *H04L 12/44* | (2006.01) |

(52) U.S. Cl.
CPC .......... *E21B 33/0355* (2013.01); *E21B 47/12* (2013.01); *H04L 12/2801* (2013.01); *H04L 12/42* (2013.01); *H04L 12/44* (2013.01)

(58) Field of Classification Search
CPC .. E21B 33/0355; E21B 41/0007; E21B 47/12; H01Q 1/04; H04L 12/2801; H04L 12/42; H04L 12/44
See application file for complete search history.

(56) References Cited

U.S. PATENT DOCUMENTS 9,749,252 B2 *   8/2017  Katar ................... H04L 47/365
2013/0051268 A1   2/2013  Nassar
(Continued)

FOREIGN PATENT DOCUMENTS

EP       2347313            8/2011
EP       2357313 A2 *       8/2011   ........... H05K 7/1434
(Continued)

OTHER PUBLICATIONS

B. Clark, "Advanced Applications of Subsea Control Systems," Jun. 13, 2002, SCADA 2002, http://www.onepetro.org/download/conference-paper/SUT-SCADA-02-135?id=conference-paper/SUT-SCADA-02-135.
(Continued)

*Primary Examiner* — James G Sayre
(74) *Attorney, Agent, or Firm* — Carlson, Gaskey & Olds, P.C.

(57) ABSTRACT

Example embodiments presented herein are directed towards a subsea control system for transmitting subsea related data to and from a topside control system with the use of Subsea Electronic Modules (SEMs) connected in a network in a multidrop configuration.

22 Claims, 6 Drawing Sheets

(56) References Cited

U.S. PATENT DOCUMENTS

2013/0307699 A1   11/2013  Brekke
2016/0084076 A1*  3/2016  Fanini ..................... H04L 67/12
                                                            340/853.1
2017/0314357 A1*  11/2017  Kent ....................... E21B 47/06

FOREIGN PATENT DOCUMENTS

EP       2811350         12/2014
EP       2811350 A1 *    12/2014   ......... E21B 33/0355
WO       2008/020152      2/2008
WO       2012/041535      4/2012

OTHER PUBLICATIONS

International Search Report and Written Opinion dated Aug. 31, 2018 in corresponding PCT Application No. PCT/GB2018/051806.
Office Action dated Nov. 16, 2017 in corresponding GB Application No. GB1710523.0.

* cited by examiner

SUBSEA CONTROL SYSTEM

CROSS REFERENCE TO RELATED APPLICATIONS

This application is a 35 U.S.C. 371 National Stage of International Application No. PCT/GB2018/051806, titled "A SUBSEA CONTROL SYSTEM", filed Jun. 28, 2018, which claims priority to GB Patent Application No. 1710523.0, titled "A SUBSEA CONTROL SYSTEM," filed Jun. 30, 2017, which are incorporated by reference herein in their entirety.

Example embodiments presented herein are directed towards a subsea control system for transmitting subsea related data to and from a topside control system with the use of Subsea Electronic Modules (SEMs) connected in a network in a multidrop configuration.

BACKGROUND

A subsea control system typically has a data network and an electric power supply system that is distributed from an Umbilical termination unit or other units that is connecting the subsea control system to the topside control system. All equipment that includes a control system is connected as part of a distribution system by using Electric Flying Leads (EFL).

One example of the use of a subsea control system is in the extraction of oil and gas product. To extract oil and gas product from geological formations in subsea reservoirs located under the sea bed, a wellbore can be drilled to the formation and a subsea production system can be installed to interface between the downhole apparatus and topside and effect the recovery of product through a pipeline. Some or all of the components making up the subsea production system may be provided on one or more of the seabed itself, in a floating location subsea, or at a topside location. Subsea production systems thus comprise apparatus' that may be installed in relatively difficult-to-access locations and to be effective in their operation they may be reliably controllable and operable for timespans on the order of the productive life of the well in such a way as to efficiently recover the product from the well. To aid this effective and reliable control and operation, the condition and performance of components of the subsea apparatus may be monitored to determine the integrity and operational effectiveness of the subsea production system.

Other applications of a subsea control system may include, for example, in the control of subsea injection systems such as carbon capture systems and/or standalone liquid or gas injection systems. Additionally or alternatively a subsea control system may be used to control subsea fluid injection, boosting, pumping, compression and/or filtration apparatus. Additionally or alternatively a subsea control system may find application in apparatus used for offshore energy generation and/or storage. For example, a subsea control system may be used in conjunction with apparatus used in the capture and/or storage of energy from renewable sources such as wind, solar, tidal and/or wave power.

It is in the above context that the disclosure of the present application has been devised.

SUMMARY

Current systems used for distributing control information from the subsea control system to the topside control system typically employ a single point-to-point modem based communication scheme or a very bandwidth limited point to multipoint scheme. This is also the case for the subsea distribution. In order to achieve the required bandwidth a point to point structure is typically deployed, which is costly from an interconnect point of view.

Thus, at least some of the example embodiments provided herein are directed towards providing a flexible system which includes simpler interconnects, i.e. less cables and infrastructure for the subsea interconnection. Furthermore, the example embodiments presented herein provide for communications with improved speed.

Accordingly, the example embodiments are directed towards a subsea control system for transmitting and receiving subsea related data to and from a topside control system. The subsea control system comprises at least one connecting Subsea Electronic Module (SEM) in connection with at least one high speed communications conduit. The at least one connecting SEM is configured to receive and transmit the subsea related data to and from the topside control system via the at least one high speed communications conduit. The system further comprises a plurality of processing SEMs connected in a network in a multidrop configuration with the at least one connecting SEM. The plurality of processing SEMs are configured to receive and transmit the subsea related data on the at least one high speed communications conduit through the at least one connecting SEM and the network in the multidrop configuration.

In a multidrop configuration, each of the connecting SEMs are connected to the same communications line. Subsea related data communicated on the multidrop network is therefore received by each of the connecting SEMs.

An example advantage of the system described above is with the use of the multidrop configuration, the topside control system may be in communication with any number of subsea components via the at least one connecting SEM. Thus, the multidrop configuration allows for fewer communication lines subsea from the interconnecting SEM, providing the topside connection, to the distributed Subsea SEM's. That is, there is no requirement for a separate point-to-point connection between a connecting SEM and each of the processing SEMs. In a multidrop configuration a single communications line is provided, to which each of the processing SEMs are connected, thereby reducing the number of subsea communication lines.

The receiving and transmitting of the subsea related data on the at least one high speed communications line through the at least one connecting SEM and the network in the multidrop configuration may utilise OFDM. The network in the multidrop configuration may provide a shared medium for Layer 2 data transfer. For example, a shared medium for Layer 2 Ethernet traffic may be provided. In some embodiments the at least one high speed communications conduit and the network in the multidrop configuration may provide a shared medium for Layer 2 data transfer.

The receiving and transmitting of the subsea related data on the at least one high speed communications conduit through the at least one connecting SEM and the network in the multidrop configuration may utilise a high number of carriers which may allow a wider usable signal bandwidth.

The at least one high speed communications conduit, the at least one connecting SEM and the network in the multidrop configuration may support communications over a bandwidth of about 50 MHz or more. In some embodiments, communication over a bandwidth of about 80 MHz of more may be supported. In some embodiments, the communication bandwidth may extend from approximately 1 MHz to about 80 MHz. For example, the communication bandwidth may extend from about 1.8 MHz to about 86 MHz.

The at least one high speed communications conduit, the at least one connecting SEM, the processing SEMs and the network in the multidrop configuration may be configured to support tone maps. Tone maps may enable different encoding on different carriers, dependent on the noise level on that specific carrier, which enables use of all frequencies efficiently according to the required SNR.

The at least one high speed communications conduit, the at least one connecting SEM, the processing SEMs and the network in the multidrop configuration may be configured to support at least one of CSMA and/or TDMA channel access, 128 bit AES encryption and/or MIMO The at least one high speed communications conduit, the at least one connecting SEM, the processing SEMs and the network in the multidrop configuration may be configured to support power save modes. For example, at least one of the SEMs and/or devices connected to the SEMs may be allowed to be asleep in various intervals that are multiples of a beacon period on the network.

The receiving and transmitting on the at least one high speed communications conduit may be in compliance with the IEEE 1901 or ITU-T G.hn standard.

A further example advantage of the system described above is the ability to provide a wider signal bandwidth due to the use of the IEEE 1901 or ITU-T G.hn standard. According to the example embodiments, communications via an IEEE 1901 or ITU-T G.hn standard compliant interface provide wide band coverage with connections speeds of a few hundred Mbits/s over short distances (tens of meters) and a few tens of Mbit/s over a few hundred meters.

The base technology in IEE1901 or ITU-T G.hn networks is based on OFDM communication, which is used in many Power Line Communication solutions and in multidrop modem technologies. However IEEE1901 and ITU-T G.hn compliant technologies combines OFDM with numerous of other techniques/technologies to be able to provide very high bandwidth connections in a multidrop topology, providing a shared medium for L2 Ethernet traffic. The other techniques applied are a very high number of carriers which allow a wider usable signal bandwidth, from, for example, 1.8 to 86 MHz. The concept of tone maps which enables different encoding on the different carriers, dependent on the noise level on that specific carrier, which enables use of all frequencies efficiently according to the required SNR. Higher order modulation and code rates, up to QAM4096 in environments with good SNR. Efficient notching of noisy frequencies that enables operation in very noisy environments where the noise is present at specific frequencies. Turbo convolution code Forward error correction to enable secure transfer of the data, enabling operation in environment with decreased SNR. The technology provides both CSMA and TDMA channel access in addition to 128 bit AES encryption. In addition MIMO is supported in Homeplug AV2 systems with more than 1 pair of wires. In addition the technology provides effective power save modes, allowing a device to be asleep in various intervals that are multiples of the beacon period. The combination of OFDM and the other techniques/technologies is what makes the IEE1901 and ITU-T G.hn compliant solutions much more effective with respect to increased bandwidth compared to the previous deployed multidrop solutions.

According to some of the example embodiments, the high speed communications conduit may be an optical cable, Ethernet, a high-speed modem, Digital Subscriber Line (DSL) or similar.

According to some of the example embodiments, the receiving and transmitting on the at least one high speed communications conduit is via an IEEE 1901 or ITU-T G.hn standard compliant Interface. Examples of communication means in compliance with IEEE 1901 are Homeplug AV R1.0/2.0 or Green-Phy. According to some of the example embodiments, Power Line Communications (PLC) may be employed by the embodiments described herein.

According to some of the example embodiments, the plurality of processing SEMs are configured in a star, tree or ring topography. It should be appreciated that any other topography providing a multidrop connection may also be employed.

An example advantage of a star, tree or ring topography is the ability to provide efficient communications between the at least one connecting SEM and the plurality of processing SEMs.

According to some of the example embodiments, the at least one connecting SEM and the plurality of processing SEMs comprise A/B redundancy. For example, a B redundancy system may be configured to operate in the presence of a failure of an A redundancy system. That is, at least one of the components of the subsea control system may be provided in duplicate. In the presence of a failure of one of the duplicated components, the other of the duplicated components may be operated.

In some example embodiments, the subsea control system may include a first connecting SEM and a second connecting SEM. The first connecting SEM may be in connection with a first high speed communication conduit and configured to receive and transmit the subsea related data to and from the topside control system via the first high speed communications conduit. The second connecting SEM may be in connection with a second high speed communications conduit and configured to receive and transmit the subsea related data to and from the topside control system via the second high speed communications conduit. Both the first and second connecting SEMs may be connected in a multidrop configuration with the plurality of processing SEMS. In the presence of a failure of one of the first connecting SEM and/or the first high speed communications conduit, the second connecting SEM and the second high speed communications conduit may be operated. The second connecting SEM and the second high speed communications conduit therefore provide redundancy with the first connecting SEM and the first high speed communications conduit.

According to some of the example embodiments, the subsea control system may comprise a Christmas tree for sealing a subsea well. At least some of the plurality of processing SEMs may form part of the Christmas tree. For example, at least some of the plurality of processing SEMs may comprise one or more actuators (e.g. valves) and/or instruments (e.g. sensors) for monitoring and sealing a subsea well.

According to some of the example embodiments, the at least one connecting SEM and the plurality of processing SEMs receive and transmit the subsea related data on dedicated communication wires or power lines.

An example advantage of using dedicated communication wires is that since such communication means is only used for communications between the at least one connecting SEM and the plurality of processing SEMs, increased communication speeds may be achieved due to reduced noise levels.

According to some of the example embodiments, the at least one connecting SEM and the plurality of processing SEMs comprise an IEEE 1901 or ITU-T G.hn standard compliant interface configured to receive and transmit the subsea related data. Thus, the SEMs of the system may comprise dedicated hardware for processing communications as discussed herein.

According to some of the example embodiments, at least one of the processing SEMs comprises an end device. An end device is a source or destination device in the subsea control system. That is, at least one of the processing SEMs may comprise a device which acts as a source of subsea related data and/or is the intended destination for the subsea related data. The subsea control system may comprise one or more end devices which are connected to a connecting SEM in a multidrop configuration.

The end device may comprise an actuator and/or an instrument such as a sensor. The actuator and/or instrument may be suitable for use in a subsea process. The subsea process may, for example, form part of a subsea production process. The subsea process may relate to fluid injection, boosting, pumping, compression and/or filtration. Additionally or alternatively the subsea process may relate to offshore energy generation and/or storage.

According to an aspect of the invention there is provided a subsea control system comprising one or more of the features of any other examples, embodiments, aspects or claims. Features presented as essential in other aspects and embodiments are not necessarily essential in this aspect.

The subsea control system may be for transmitting and receiving subsea related data to and from a topside control system. The subsea control system may comprise at least one connecting Subsea Electronic Module (SEM) in connection with at least one high speed communications conduit. The at least one connecting SEM may be configured to receive and transmit the subsea related data to and from the topside control system via the at least one high speed communications conduit. The system may further comprise a plurality of processing SEMs connected in a network in a multidrop configuration with the at least one connecting SEM. The plurality of processing SEMs may be configured to receive and transmit the subsea related data on the at least one high speed communications conduit through the at least one connecting SEM and the network in the multidrop configuration.

The receiving and transmitting on the at least one high speed communications conduit may be in compliance with the IEEE 1901 or ITU-T G.hn standard.

Some of the example embodiments are directed towards a subsea oil and gas production system comprising the components as described above. Some of the example embodiments, are directed towards apparatus for subsea fluid injection, boosting, pumping, compression and/or filtration comprising the components as described above. Some of the example embodiments are directed towards apparatus for offshore energy generation and/or storage comprising the components as described above.

Some of the example embodiments are directed towards a method for transmitting and receiving subsea related data to and from a topside control system and a subsea control system. The method comprises receiving and transmitting, in at least one connecting SEM, the subsea related data via at least one high speed communications conduit. The method further comprises transmitting and receiving, to and from, respectively, a plurality of processing SEMs connected in a network in a multidrop configuration with the at least one connecting SEM or to the topside control system, the subsea related data. The method may also comprise the receiving and transmitting on the at least one high speed communications conduit being in compliance with the IEEE 1901 or ITU-T G.hn standard.

Some of the example embodiments are also directed towards a computer readable medium comprising executable instructions such that when executed by subsea control system provide for transmitting and receiving subsea related data to and from a topside control system. The instructions comprise receiving and transmitting, in at least one connecting Subsea Electronic Module, SEM, the subsea related data via at least one high speed communications conduit. The instructions further comprise transmitting and receiving, to and from, respectively, a plurality of processing SEMs connected in a network in a multidrop configuration with the at least one connecting SEM, the subsea related data. The receiving and transmitting on the at least one high speed communications conduit may be in compliance with the IEEE 1901 or ITU-T G.hn standard.

Computer readable mediums referred to herein may comprise a non-transitory computer readable medium.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for the purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Current systems used for distributing control information from the subsea control system to the topside control system typically utilizes high speed point to point links or very limited bandwidth multidrop links subsea. Such systems are not able to combine high bandwidth and flexible interconnect at the same time, which is required in modern subsea control systems. At least some of the example embodiments provided herein are directed towards providing a flexible system with improved interconnections.

Figure 1:
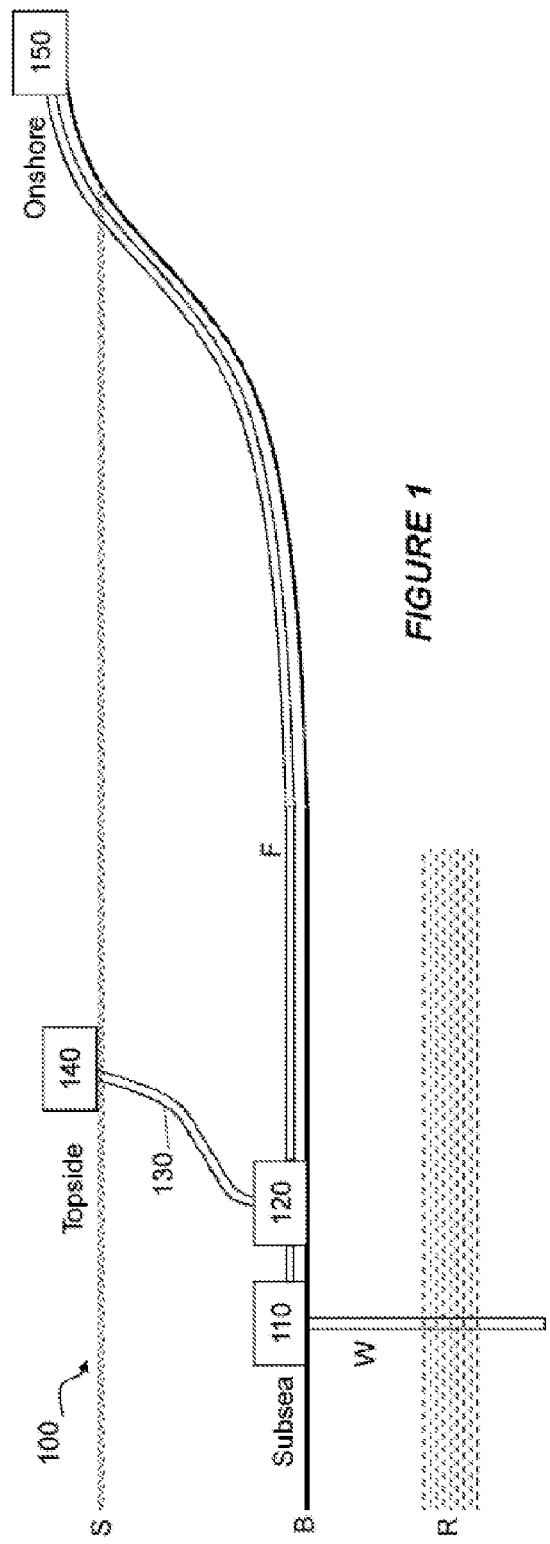
FIG. 1 is a schematic illustration of a subsea production system in accordance with some of the example embodiments presented herein.

Referring now to FIG. 1, to extract oil and gas product from a subsea reservoir R found in a geological formation located under the sea bed, a wellbore W has been drilled to the formation. The wellbore W may be a cased wellbore or open hole and may include a production tubing for conveying the oil and gas product up the wellbore W.

A subsea production system 100 extracting the oil and gas product from the wellbore W is provided. A subsea production system 100 may extract product from plural wellbores, although only a single well is shown in FIG. 1. The subsea production system 100 can be installed to interface between the apparatus downhole in the well W and topside and effect the recovery of product to onshore locations through a flowline F. Some or all of the components of the subsea production system 100 may be provided at subsea locations on the seabed or floating subsea, at topside locations at the sea surface in the field, or at onshore locations away from the field.

In terms of equipment, the subsea production system 100 may include wellhead apparatus 110 located at the head of the well. The wellhead apparatus 110 and may include subsea structures and manifolds which may include a Christmas tree to seal the well and provide valves, spools, connectors and a manifold system. The well may be tied-in through the Christmas tree to a subsea flowline system F through which the product may be retrieved to an onshore location 150. The subsea structures and production system 100 may also provide a subsea access or intervention system to allow access to the well for monitoring and control of the downhole apparatus such as chokes and valves, cabling, sensors and strain gauges, and other tools, and also for interventions and workovers. The subsea production system 100 may at the wellhead apparatus 110 also include one or more subsea pumps to control the production or to transport the hydrocarbons from the well W to the sea surface or to land, for example through flowline F.

The subsea production system 100 may also include subsea apparatus 120 providing production system equipment located on the seabed or floating subsea. The subsea apparatus 120 may be coupled to one or more wellhead apparatuses 110 at one or more subsea wells. The subsea apparatus 120 may also include one or more pumps for pumping product from one or more wellbores or for pumping product along one or more flow lines. In addition to the Subsea apparatus may include functions like subsea processing, separation and compression/boosting for treatment of the products from the wells or the flowline. The subsea apparatus 120 may also include one or more Subsea Control Modules (SCM) to facilitate the management and monitoring of the subsea production system 100. The SCM may include plural Subsea Electronics Modules (SEM) providing a data communications interface with components of the subsea production system 100, including various Condition and Performance Monitoring apparatus (CPM). The SCMs, SEMs and CPMs will be described further below.

The subsea production system 100 may also include an umbilical apparatus 130 configured to couple the subsea apparatus 120 to a topside apparatus 140 of the subsea production system 100. The umbilical apparatus 130 may carry hydraulic and other fluid flow lines, and electrical and other signal-carrying cabling to transmit control and monitoring signals between the components of the subsea production system 100 located topside and subsea.

The topside apparatus 140 may be located at one or more topside platforms provided on rigs or semi-submersibles to perform one or more production functions such as allowing an operator of the subsea production system 100 in the field to manage the operation of the apparatus of the subsea production system 100. The topside apparatus 140 may include, for example, a Master Control Station (MCS) provided as a centralised hardware and software platform for enabling the monitoring, control and logging of the subsea production system and the condition and performance monitoring of the components. The MCS may also provide an operator with one or more user interfaces at a workstation to monitor and control the subsea production system. The MCS may be coupled to plural SCMs located subsea via umbilical 130.

The subsea production system 100 may also include onshore apparatus 150 by which the operator of the production system may monitor and control certain components and functions of the subsea production system 100 from onshore, live and in real time, or offline. For example, the logical components and software and data storage architecture making up the subsea production control system (described in more detail below) maintained in the MCS or in particular the FMS thereof may be duplicated or synchronised to one or more onshore locations. Further, while not shown, plural subsea production systems 100 may be coupled, for example via onshore apparatuses 150, to a centralised production monitoring system, which may, for example, be used to aggregate information about the performance and operation of the plural subsea production systems 100 across different fields. Analysis of the aggregated information be shared among operators of subsea production systems to facilitate their management and optimisation, and may be used to facilitate and improve the designing and installation of production systems to improve yields and efficiency.

Whilst embodiments have been described above with reference to FIG. 1 in which a subsea control system forms part of a subsea production system, the components and methods described herein may be suitable for use in any subsea application. For example, subsea control systems described herein may form part of apparatus suitable for subsea fluid injection, boosting, pumping, compression and/or filtration. Additionally or alternatively subsea control systems described herein may be form part of apparatus suitable for offshore energy generation and/or storage. For example, subsea control systems described herein may form part of apparatus suitable for capturing and/or storing energy from renewable sources such as wind, solar, tidal and/or wave power.

Figure 2:
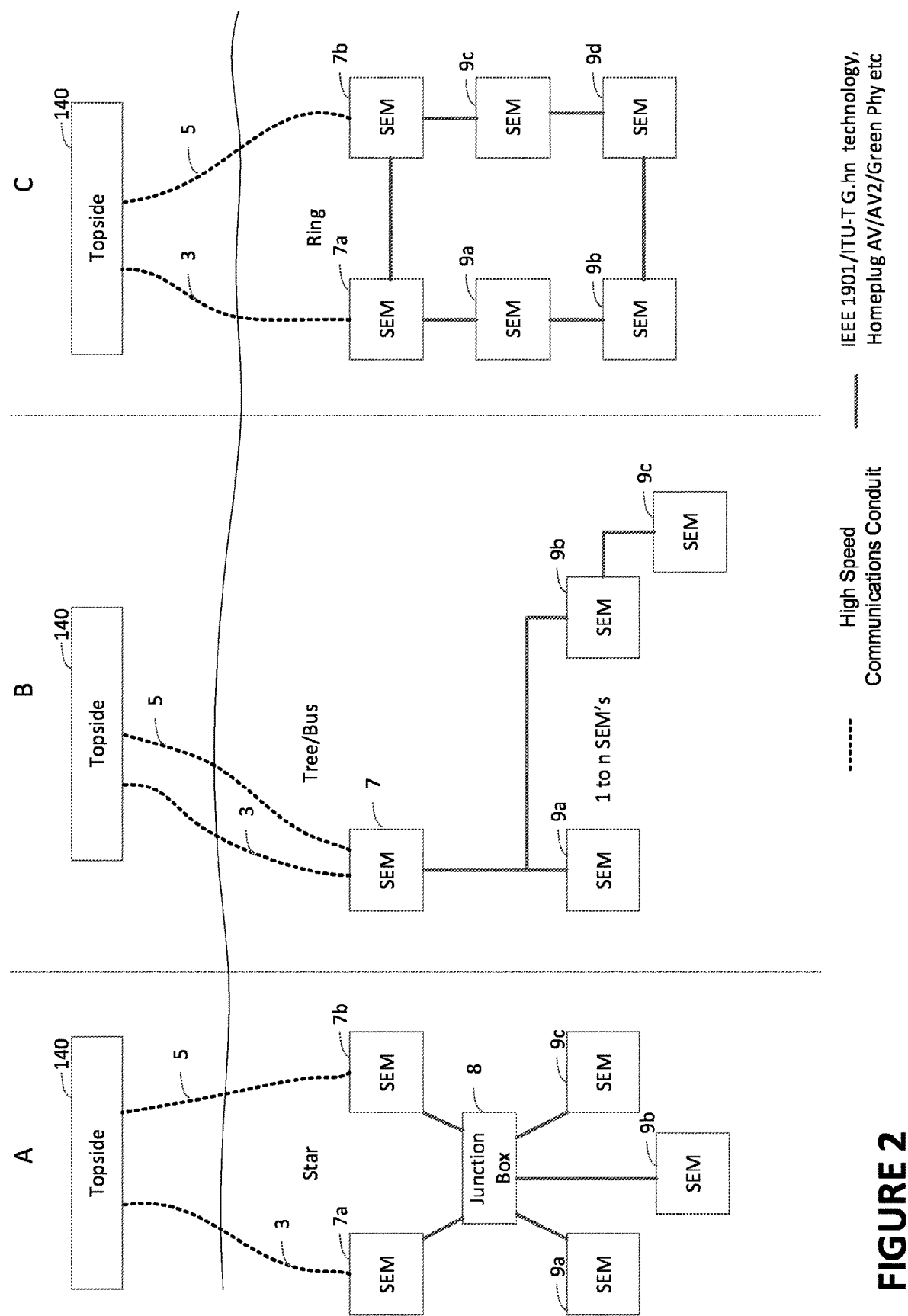
FIG. 2 provides illustrative examples of the subsea control system for transmitting subsea related data to and from a topside control system, according to some of the example embodiments presented herein.

FIG. 2 illustrates three example system configurations A, B and C, with respect to an interaction between the SEMs of the subsea control system with the topside control system, according to some of the example embodiments presented herein. Example system configuration A illustrates a topside control system 140 in communication with two connecting Subsea Electronic Modules (SEMs) 7a and 7b via high speed conduits 3 and 5.

According to some of the example embodiments, the high speed conduits may be an optical cable, or a high-speed modem. The high speed conduits may employ Digital Subscriber Line (DSL) or Ethernet. According to some of the example embodiments, the high speed conduits may be dedicated communication wires or power lines. Thus, the high speed conduits may be used for the sole purpose of distributing control and processing related data to and from the topside control system and the subsea control system, enabling more advanced subsea control functions and monitoring.

The connecting SEM(s) is the point of contact between the topside control system and the multidrop network. The connection SEMs 7a and 7b may be configured to distribute control and/or processing data to any number of processing SEMs (e.g., processing SEMs 9a, 9b and 9c as illustrated in FIG. 2, configuration A) connected in a network in the multidrop configuration.

Example configuration A of FIG. 2 illustrates the multidrop network in a star topology where a central junction box 8 is configured to distribute communications throughout the multidrop network. It should be appreciated that any other form of multidrop network configuration may be employ which allows multiple components (or SEMs) to receive information or data from a same communications channel or port (e.g., the high speed communications conduit and the connecting SEM).

In a multidrop network, each component is connected to the same communications line or BUS and receives communications output from each of the other connected components. That is, each of the connecting SEMS 7a, 7b and the processing SEMS 9a, 9b, 9c are connected to a single communication line or BUS and may directly communicate with the remaining SEMs connected in the same multidrop network. The junctions box 8 may simply comprise connections arranged to provide a single communications circuit running between each of the SEMs 7a, 7b, 9a, 9b, 9c and may not, for example, include a switch. It will be appreciated that in a multidrop network configuration no switch is required to route signals to specific components since each SEM is connected to the same communications line or BUS. Furthermore, there is no requirement for separate point-to-point connections between the connecting SEMS 7a, 7b and the processing SEMs 9a, 9b, 9c since each of the SEMS is connected to the same communications line or BUS.

It should be appreciated that while configuration A illustrates two high speed conduits and two connecting SEMs 7a and 7b, any number of conduits and connecting SEMs may be employed. For example, according to some of the example embodiments, the second high speed conduit 5 and second connecting SEM 7b may be redundant components of an A/B redundancy system in the case of a failure of the first high speed conduit 3 and/or connecting SEM 7a.

Example system configuration B illustrates another example topology. In the example provided in configuration B, the topside control system 140 is in communication with a single connecting SEM 7 via two high speed communications conduits 3 and 5. The connecting SEM 7 is in a multidrop network with three processing SEMs 9a, 9b and 9c. The multidrop network of configuration B is a tree topology.

In the example provided by configuration B, the connecting SEM 7 may address processing SEMs 9a and 9b directly. The connecting SEM 7 may address processing SEM 9c via processing SEM 9b through the tree topology. However, direct connection may be provided between SEM 9c and the connecting SEM 7 via the multidrop network. Functionally, the example configuration B may operate in a similar manner as explained in conjunction with example configuration A.

Example system configuration C illustrates yet another example topology. In the example provided in configuration C, the topside control system 140 is in communication with two connecting SEMs 7a and 7b via two high speed communications conduits 3 and 5. The connecting SEMs 7a and 7b are in a multidrop network with four processing SEMs 9a, 9b, 9c and 9d. The multidrop network of configuration C is a ring topology.

In the example provided by configuration C, the connecting SEMs 7a and 7b may address processing SEMs 9a and 9c, respectively, directly. The connecting SEMs 7a and 7b may address processing SEMs 9d and 9b via processing SEMs 9a and 9c, respectively, through the ring topology of the multidrop network. Functionally, the example configuration C may operate in a similar manner as explained in conjunction with example configuration A.

It should be appreciated that some of the example configurations of FIG. 2, as compared to current point-to-point based systems, provide a reduced number of communications between the topside control system and the subsea control system. That is, the use of a multidrop network means that separate point-to-point connections between the at least connecting SEM and each of the processing SEMs may not be required.

It should be appreciated that the three configurations of FIG. 2 may utilize an IEEE 1901 or ITU-T G.hn standard in communications with the high speed conduit(s). An example advantage of the use of the IEEE 1901 or ITU-T G.hn standard is the ability to provide a wider signal bandwidth. According to the example embodiments, communications via an IEEE 1901 or ITU-T G.hn standard compliant interface provide wide band coverage with connections speeds of a few hundred Mbits/s over short distances (tens of meters) and a few tens of Mbit/s over a few hundred meters.

The base technology in IEE1901 or ITU-T G.hn networks is based on OFDM communication, which is used in many Power Line Communication solutions and in multidrop modem technologies. However IEEE1901 and ITU-T G.hn compliant technologies combines OFDM with numerous of other techniques/technologies to be able to provide very high bandwidth connections in a multidrop topology, providing a shared medium for L2 Ethernet traffic. The other techniques applied are a very high number of carriers which allow a wider usable signal bandwidth, from, for example, 1.8 to 86 MHz. The concept of tone maps which enables different encoding on the different carriers, dependent on the noise level on that specific carrier, which enables use of all frequencies efficiently according to the required SNR. Higher order modulation and code rates, up to QAM4096 in environments with good SNR. Efficient notching of noisy frequencies that enables operation in very noisy environments where the noise is present at specific frequencies. Turbo convolution code Forward error correction to enable secure transfer of the data, enabling operation in environment with decreased SNR. The technology provides both CSMA and TDMA channel access in addition to 128 bit AES encryption. In addition MIMO is supported in Homeplug AV2 systems with more than 1 pair of wires. In addition the technology provides effective power save modes, allowing a device to be asleep in various intervals that are multiples of the beacon period. The combination of OFDM and the other techniques/technologies is what makes the IEE1901 and ITU-T G.hn compliant solutions much more effective with respect to increased bandwidth compared to the previous deployed multidrop solutions. One or more of the processing SEMs comprises an end device. An end device is a source or destination device in the subsea control system. That is, at least one of the processing SEMs may comprise a device which acts as a source of subsea related data and/or is the intended destination for the subsea related data. One or more processing SEMs comprising end devices may be connected to a connecting SEM in a multidrop configuration. An end device may, for example, comprise an actuator and/or sensor. The actuator and/or sensor may be suitable for use in a subsea production process or in any other subsea process.

Figure 3:
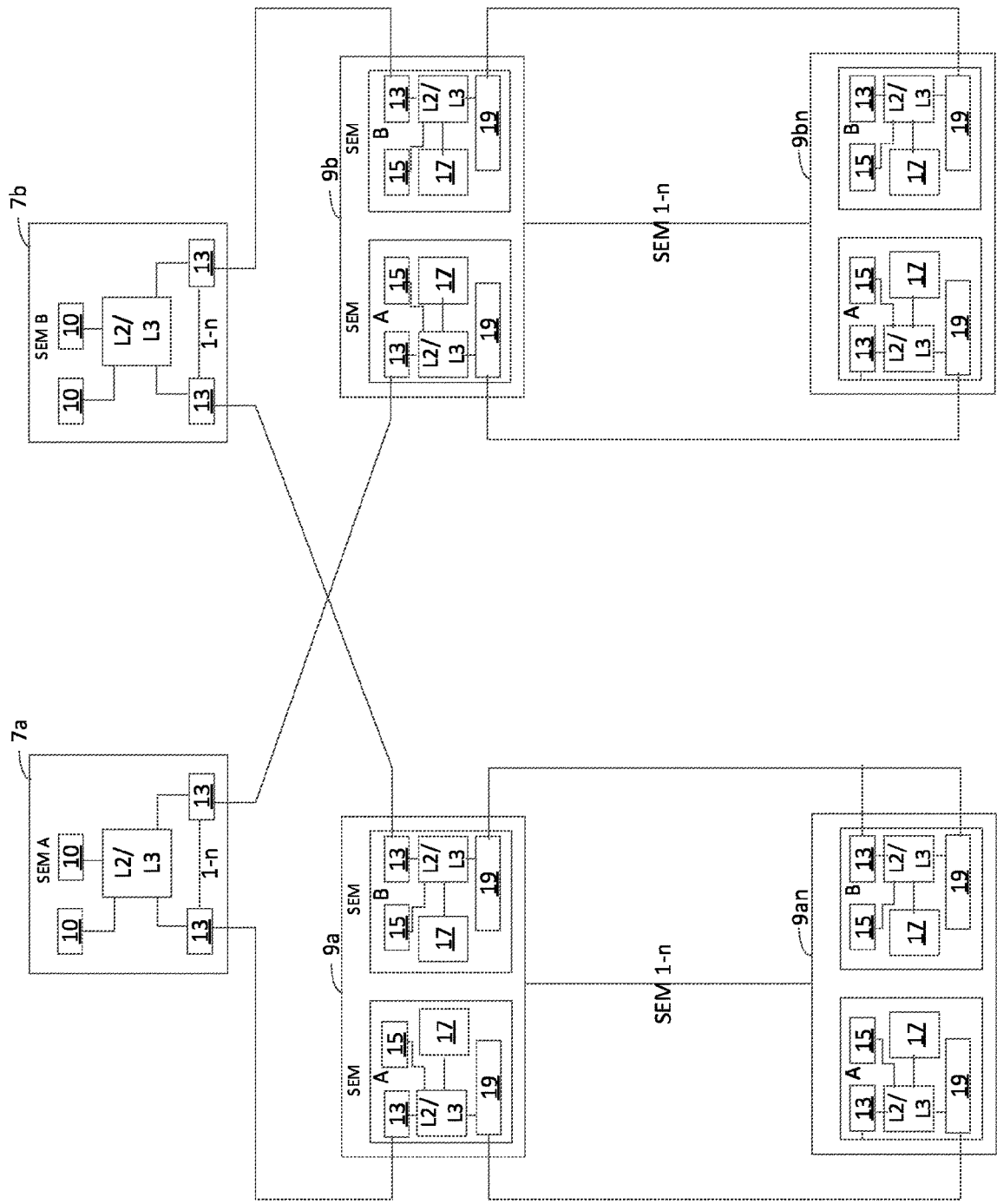
FIG. 3 is an illustrative example of a SEM configuration, according to some of example embodiments presented herein.

FIG. 3 provides a hardware overview of the connecting and processing SEMs of FIG. 2. As illustrated in FIG. 3, two connecting SEMs 7a and 7b may act as a distribution point in the multidrop network in case the topside connection is not provided directly to the processing SEM 9a and 9b. The connecting SEMs 7a and 7b may be in communication with any number of processing SEMs 9a-9an and 9b-9bn. It should be appreciated that the processing SEMs of FIG. 3 may be in a multidrop network configuration as illustrated by example configures A, B and C of FIG. 2, or any other multidrop topology known in the field.

The connecting SEMs 7a and 7b may comprise hardware interfaces 10 for receiving communications originating from the topside control system 140 (not shown), as well as sending communications to the topside control system. It should be appreciated that the hardware interfaces 10 may be configured to be compatible with a communication type of the high speed communications conduit(s) 3 and 5 (not shown).

The connecting SEMs 7a and 7b may further comprise a Layer 2/3 (L2/L3) switch. The L2/L3 switch may utilize a Medium Access Control (MAC) address or an Internet Protocol (IP) address to route incoming communications (e.g., from the topside control system) to an appropriate processing SEM 9a-9an and/or 9b-9bn.

The connecting SEMs 7a and 7b may also comprise a Digital Subscriber Line/Ethernet port (DSL/ETH) 13 which may be in communication with any number of other DSL/ETH ports 13 of the processing SEMs 9a-9an and/or 9b-9bn. Through this hardware interface, the connecting SEM(s) 7a and/or 7b may distribute communications throughout the multidrop network.

Each processing SEM 9a-9an and 9b-9bn within the multidrop network may comprise a DSL/ETH port 13 as discussed above, as well as a Subsea Instrumentation Interface Standardisation Level 3 (SIIS3) device 15. The SIIS3 device 15 is an Ethernet Transmission Control Protocol/Internet Protocol (TCP/IP) device which comprises protocols used for moving communication packets throughout the multidrop network. The processing SEMs 9a-9an and 9b-9bn may also comprise a L2/L3 switch as described above, as well as a host device 17. The host device 17 also supports the multidrop network in routing incoming communication packets to a designated processing SEM 9a-9an and 9b-9bn. The processing SEMs 9a-9an and 9b-9bn may also comprise an IEEE 1901 or ITU-T G.hn standard compliant interface 19.

It should be appreciated that all of the communication means between the different processing SEMs 9a-9an and 9b-9bn and the connecting SEM 7a and 7b to the processing SEMs, may be dedicated communication wires or power lines. Similarly, the high speed communications conduit 3 and 5 may also be a dedicated communication means.

Figure 4:
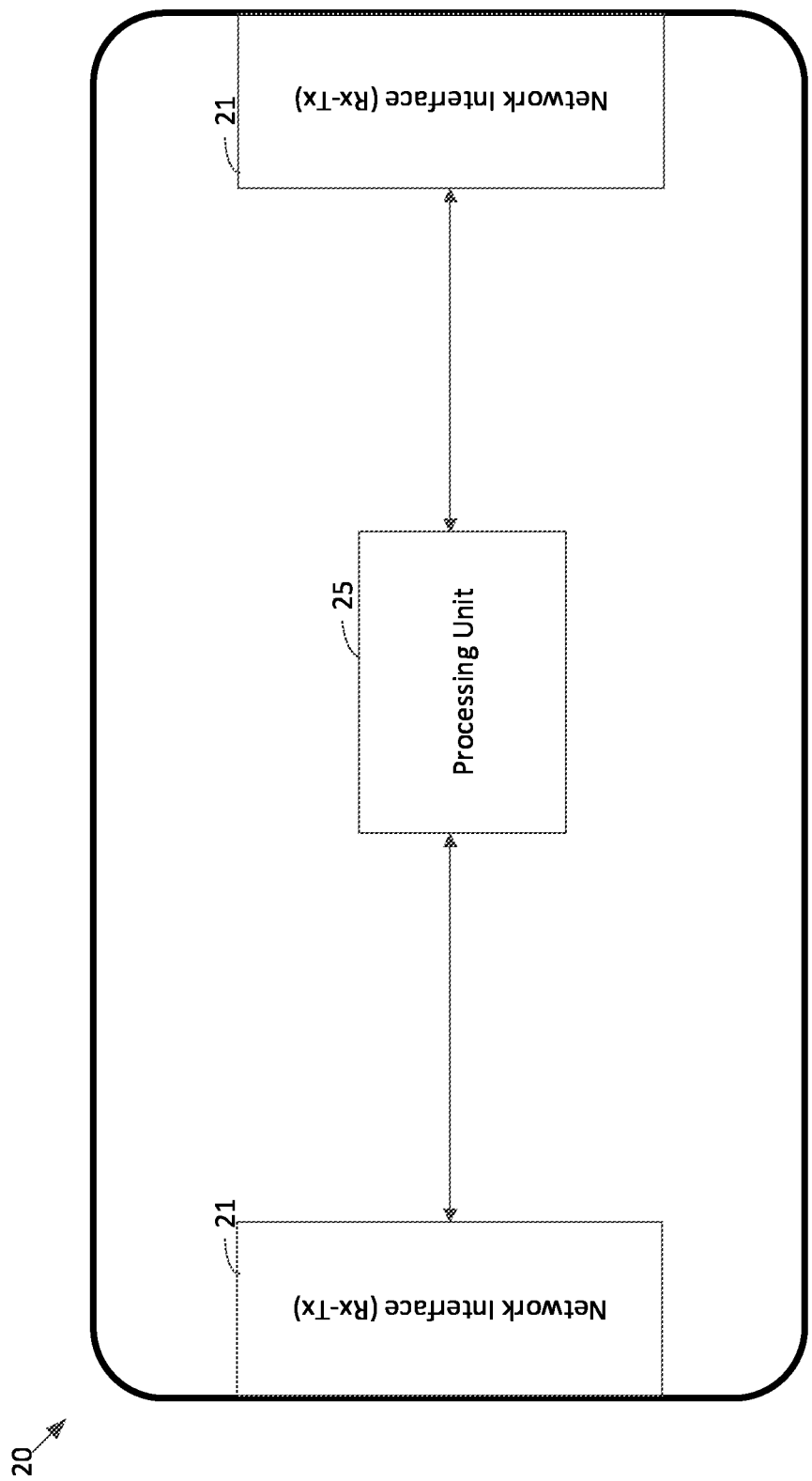
FIG. 4 is an illustrative example of a further SEM configuration, according to some of the example embodiments presented herein.

FIG. 4 illustrates a hardware configuration 20 of any of the SEM components illustrated in FIG. 3. The hardware configuration 20 of FIG. 4 may comprise any number of network interfaces 21 which may be configured to receive and transmit any form of processing or control information as described herein. According to some of the example embodiments, the network interface may also comprise a single transceiving interface or any number of receiving and/or transmitting interfaces.

The hardware configuration 20 of FIG. 4 may also comprise at least one processing unit 25 which may be configured to process received subsea related data to and from a topside control system and/or data from the monitored subsea system. The processing unit 25 may also be configured to assist in the routing of data through the multidrop network. The processing unit 25 may be any suitable computation logic, for example, a microprocessor, digital signal processor (DSP), field programmable gate array (FPGA), or application specific integrated circuity (ASIC) or any other form of circuitry.

Figure 5:
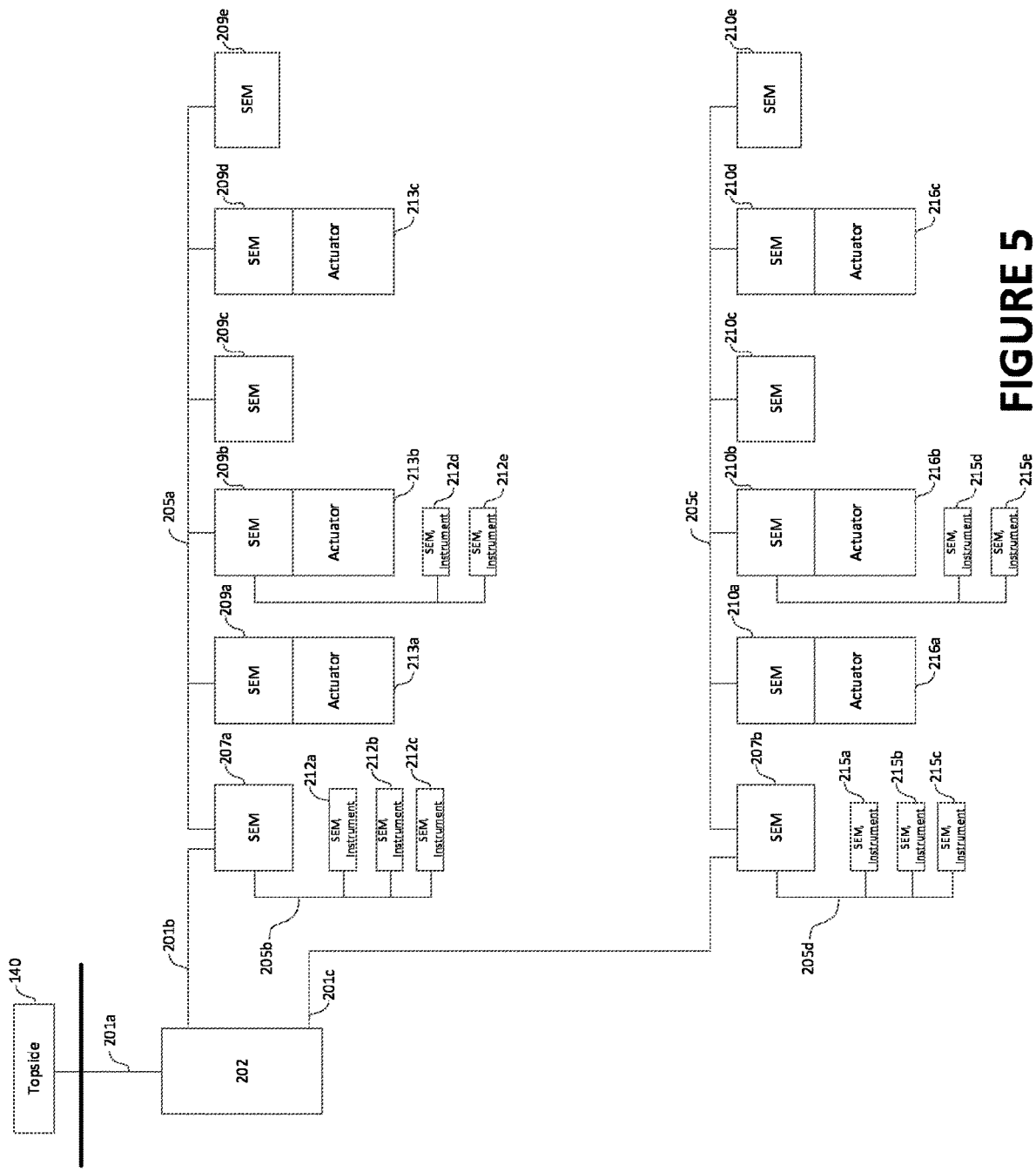
FIG. 5 is an illustrative example of a subsea control system.

FIG. 5 is an illustrative example of a subsea control system according to an example embodiment. The embodiment shown in FIG. 5 includes four subsea multidrop networks 205a-205d in communication with a topside control system 140. The topside control system 140 is in communication with two connecting SEMS 207a and 207b via high speed communications conduits 201a, 201b, 201c. A first section of high speed communications conduit 201a extends between the topside control system 140 and a relay module 202. A second section of high speed communications conduit 201b extends between the relay module 202 and a first connecting SEM 207a. A third section of high speed communications conduit 201c extends between the relay module 202 and a second connections SEM 207b.

The relay module 202 is configured to relay subsea related data transmitted from the topside control system 140 to the first connecting SEM 207a and/or the second connecting SEM 207b. The relay module 202 is further configured to relay subsea related data transmitted from the first connecting SEM 207a and/or the second connecting SEM 207b to the topside control system 140. In at least some embodiments, the relay module 202 may simply repeat signals received on one of the sections of high speed communications conduit 201a, 201b, 201c, on at least one of the other sections of high speed communications conduit 201a, 201b, 201c. The relay module 202 may be configured to repeat signals received on one of the sections of high speed communications conduit 201a, 201b and 201c on all of the other sections of high speed communication conduit 201a, 201b, 201c. For example, the relay module 202 may transmit subsea related data received from the topside control system 140 to both the first connecting SEM 207a and the second connecting SEM 207b.

The combination of the first section of high speed communications conduit 201a, the relay module 202 and the second section of high speed communications conduit 201b forms a first high speed communications conduit arranged to transfer subsea related data between the topside control system 140 and the first connecting SEM 207a. The combination of the first section of high speed communications conduit 201a, the relay module 202 and the third section of high speed communications conduit 201c forms a second high speed communications conduit arranged to transfer subsea related data between the topside control system 140 and the second connecting SEM 207b.

It will be appreciated that the use of the relay module 202 allows the first section of high speed communications conduit 201a to be used for communication between the topside control system 140 and both the first and second connecting SEMS 207a, 207b, thereby reducing the number of materials used. In other embodiments which include a plurality of connecting SEMS in communication with a single topside control system 140, independent high speed communications conduits between the topside control system 140 and each connecting SEM may be provided.

The subsea control system shown in FIG. 5 further includes a plurality of processing SEMs 209a-209e and 210a-210e. A first subset of processing SEMs 209a-209e are connected in a multidrop configuration 205a with the first connecting SEM 207a and are configured to receive and transmit subsea related data on the first high speed communications conduit 201a, 202, 201b through the first connecting SEM 207a and the first multidrop network 205a. A second subset of processing SEMs 210a-210e are connected in a multidrop configuration 205c with the second connecting SEM 207b and are configured to receive and transmit subsea related data on the second high speed communications conduit 201a, 202, 201c through the second connecting SEM 207b and the third multidrop network 205c.

The subsea control system shown in FIG. 5 further includes a first plurality of instruments 212a-212e, 215a-215e and actuators 213a-213c, 216a-216c. The instruments 212a-212e, 215a-215e and actuators 213a-213c, 216a-216c are indicated in FIG. 5 as being SEMs or at least forming part of an SEM. For the purposes of this description an instrument and/or an actuator is considered to be an example of or form part of a passive SEM. An actuator and/or an instrument may comprise an end device in the subsea control system.

A first subset of the instruments 212a-212c are connected to the first connecting SEM 207a in a second multidrop network 205b. The instruments 212a-212c are configured to receive and transmit subsea related data on the first high speed communications conduit 201a, 202, 201b through the first connecting SEM 207b and the second multidrop network 205b.

A second subset of instruments 212d, 212e are connected in a multidrop configuration with a processing SEM 209b. Since the processing SEM 209b is connected to the first multidrop network 205a, the second subset of instruments 212d-212e are connected in a multidrop configuration with the first connected SEM 207a. The instruments 212d-212e are configured to receive and transmit subsea related data on the first high speed communications conduit 201a, 202, 201b through the first connecting SEM 207b, the first multidrop network 205a and the processing SEM 209b.

As shown in FIG. 5 the processing SEMs 209a, 209b, 209d incorporate or are at least directly coupled to actuators 213b, 213c. The actuators 213b, 213c are therefore effectively connected to the multidrop network 205a and are configured to receive and transmit subsea related data on the first high speed communications conduit 201a, 202, 201b through the first connecting SEM 207b and the first multidrop network 205a.

A similar set of components are connected to the second connecting SEM 207b and the third multidrop network 205c. No detailed description of these components is provided herein, since the components connected to the second connecting SEM 207b and the third multidrop network, mirror the components described above with reference to the first connecting SEM 207a and the first multidrop network 205a.

The instruments 212a-212e, 215a-215e and actuators 213a-213c, 216a-216c may take any form suitable for use in subsea applications. For example, the instruments 212a-212e, 215a-215e may comprise one or more sensors arranged to monitor one or more aspects of a subsea process (such as a subsea production process). The actuators 213a-213c, 216a-216c may comprise any active components suitable for use in a subsea process. For example, the actuators 213a-213c, 216a-216c may comprise one or more of a choke, valve, spool or pump for use in a subsea process.

In the arrangement shown in FIG. 5, a variety of actuators and instruments are directly connected to a connecting SEM in a multidrop configuration. The use of a multidrop configuration allows processing SEMs, actuators and/or instruments to each be directly connected to a connecting SEM without providing separate point-to-point connections between each processing SEM, actuator and instrument and the connecting SEM. The number of subsea connections used may therefore be advantageously reduced.

Furthermore, the use of a multidrop configuration removes a need to provide network switches to route data to/from specific components. For example, the connecting SEMs may not include any communications switching control thereby significantly reducing the complexity of the system.

It will be appreciated that any of the communications protocols and components described herein may be used in connection with the embodiment shown herein. For example, the embodiment shown in FIG. 5 may utilize an IEEE 1901 or ITU-T G.hn standard in communications with the high speed conduit(s), 201a, 201b, 201c. As was explained above, the IEEE 1901 and ITU-T G.hn standards support communications in a multidrop network over a large bandwidth and using a high number of carriers. This may allow a relatively large number of components such as processing SEMs, actuators and/or instruments to be connected to a single multidrop network.

As was explained above, in some embodiments a subsea control system may include a Christmas tree for sealing a subsea well. A Christmas tree comprises a plurality of actuators (e.g. valves) for sealing a well and may further comprise one of more sensors for monitoring the state of a well. In some embodiments each of the actuators and/or sensors which form a Christmas tree may be connected to the same multidrop network. This forms an efficient communications infrastructure which allows various components of Christmas tree to communicate with each other and a topside control system, without requiring point-to-point connections between each component or a centralised network switch to route communications. As was explained above, the use of the IEEE 1901 or ITU-T G.hn communications standards may allow a relatively large number of components (such as components forming a Christmas tree) to be connected to a single multidrop network.

Figure 6:
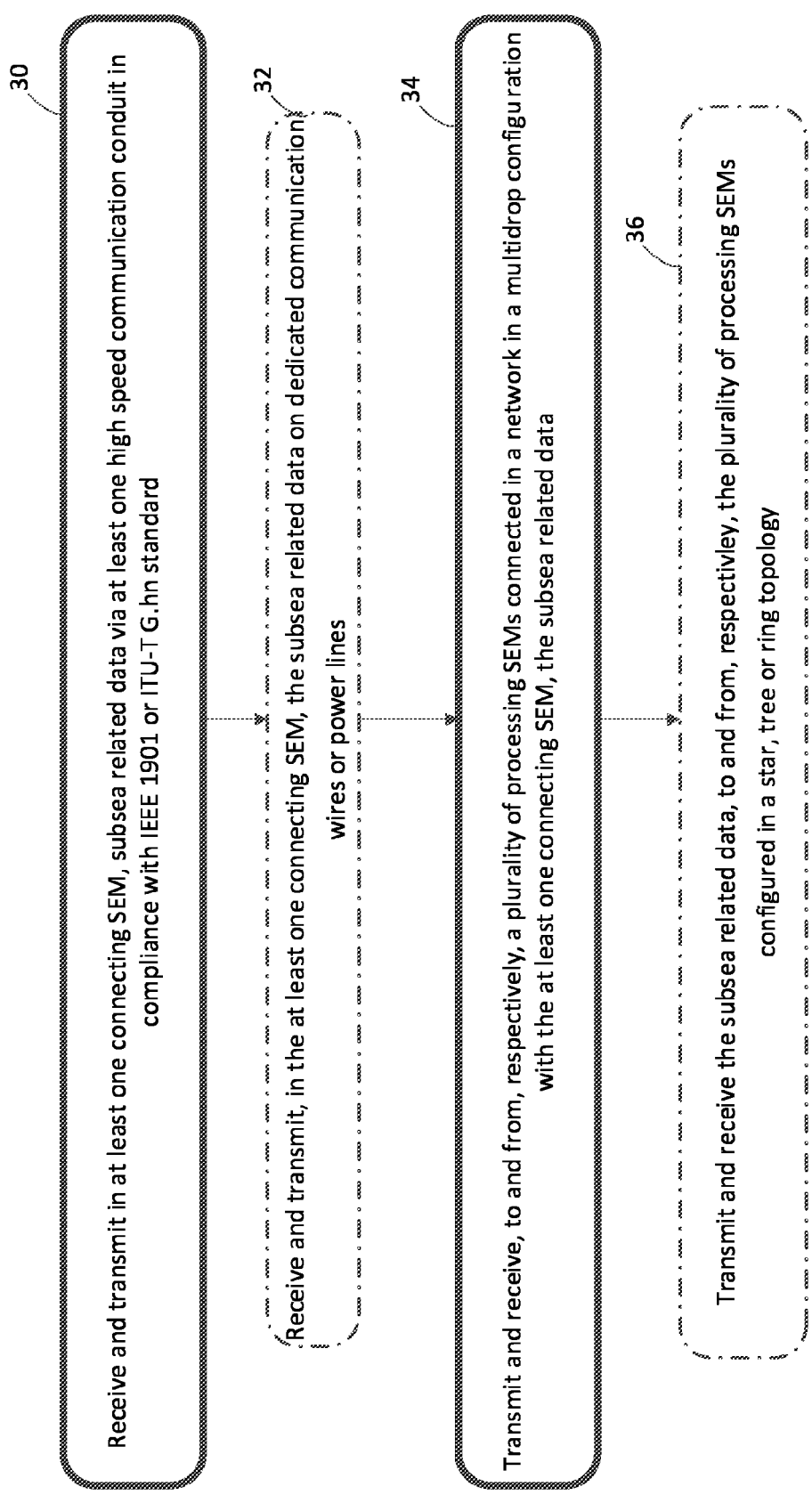
FIG. 6 is a flow diagram of example operational steps which may be performed by the SEM of FIGS. 2-5.

FIG. 6 illustrates a flow diagram depicting example operations which may be taken by the subsea control system with respect to transmitting subsea related data to and from a topside control system and a subsea control system, described herein. It should be appreciated that FIG. 6 comprises some operations which are illustrated in a solid border and some operations which are illustrated with a dashed boarder. The operations which are comprised in a solid border are operations which are comprised in the broadest example embodiment. The operations which are comprised in a dashed boarder are example embodiments which may be comprised in, or a part of, or are further operations which may be taken in addition to the operations of the boarder example embodiments. It should be appreciated that these operations need not be performed in order.

Furthermore, it should be appreciated that not all the operations need to be performed. The example operations may be performed in any order and in any combination.

Operation 30

The method comprises receiving and transmitting 30, in at least one connecting SEM 7, 7a and/or 7b, the subsea related data via at least one high speed communication conduit. The hardware interface 10 is configured to receive and transmit the subsea related data via the at least one high speed communication conduit. Specifically, the network interface 21 of interface 10 is configured to receive and transmit the subsea related data.

As described in relation to FIGS. 2 and 3, the connecting SEM 7, 7a and 7b may function as in intermediate between the multidrop network and the topside control system. It should be appreciated that such received data may originate from the topside control system 140 or from a processing SEM 9a-9an and 9b-9bn within the multidrop network. It should be appreciated that the high speed communication conduit may be compliant with an IEEE 1901 or ITU-T G.hn standard. Thus, according to some of the example embodiments, the receiving and transmitting 30 is provided via an IEEE 1901 or ITU-T G.hn standard compliant interface. The network interface 21 may be configured to receive the subsea related data via the IEEE 1901 or ITU-T G.hn standard compliant interface. According to some of the example embodiments, by using such a standard, a wider signal bandwidth may be obtained.

Examples of communication means within IEEE 1901 are the Homeplug AV R1.0/2.0 standard or Green-Phy. According to some of the example embodiments, Power Line Communications (PLC) may be employed by the embodiments described herein. An example advantage of communications via an IEEE 1901 or ITU-T G.hn standard compliant interface is that wide band coverage with connections speeds of a few hundred Mbits/s over short distances (tens of meters) and a few tens of Mbit/s over a few hundred meters. According to some of the example embodiments, the at least one high speed communication conduit may be an optical cable, Ethernet, a high-speed modem, Digital Subscriber Line (DSL).

Example Operation 32

According to some of the example embodiments, the receiving and transmitting 30 may further comprise receiving and transmitting 32 the subsea related data on dedicated communication wires or power lines. The hardware interface 10 and/or the DSL/ETH port 13 is configured to receive the subsea related data on the dedicated communication wires or power lines. Specifically, the network interface 21 of interface 10 and/or port 13 is configured to receive the subsea related data on dedicated communication wires or power lines.

An example advantage of using dedicated communication wires or power lines is that since such communication means is only used for communications between the at least one connecting SEM and the plurality of processing SEMs, increased communication speeds may be achieved.

Operation 34

The connecting SEM 7, 7a and/or 7b is configured to transmit and receive, to and from, respectively, a plurality of processing SEMs 9a-9an and 9b-9bn connected in a network in a multidrop configuration with the at least one connecting SEM or to the topside control system, the subsea related data. The receiving hardware interface 10 and/or the DSL/ETH port 13 is configured to transmit the subsea related data. Specifically, the network interface 21 of interface 10 and/or port 13 is configured to transmit the subsea related data.

An example advantage of the system described above is with the use of the multidrop configuration, the topside control system may be in communication with any number of subsea components via the at least one connecting SEM. Thus, the multidrop configuration allows for fewer communication lines from the topside level to the subsea level. Thus, the system is more flexible as having fewer communication lines from the topside to the subsea levels provides for easier upgrades to future system iterations.

It should be appreciated that the connecting SEM and/or the processing SEMs may comprise A/B redundancy such that the B redundancy system may be configured to operate in the presence of a failure of the A redundancy system. Such a system is further described in at least FIG. 2.

Example Operation 36

According to some of the example embodiments, the transmitting and receiving 34 may further comprise transmitting and receiving 36 the subsea related data to the plurality of processing SEMs 9a-9an and 9b-9bn configured in a star, tree or ring topography. The network interface 21 may be configured to transmit the subsea related data to the plurality of processing SEMs. An example advantage of a star, tree or ring topography is the ability to provide efficient communications between the at least one connecting SEM and the plurality of processing SEMs. Examples of such topographies are provided in at least FIG. 2.

Reference herein to a technical standard (e.g. the IEEE 1901 and ITU-T G.hn standards) is intended to refer to the technical standard as of the priority date of the present application.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A subsea control system for transmitting and receiving subsea related data to and from a surface control system, the subsea control system comprising:
   at least one connecting Subsea Electronic Module, SEM, in connection with at least one high speed communications conduit, wherein the at least one connecting SEM is configured to receive and transmit the subsea related data to and from the topside control system via the at least one high speed communications conduit; and
   a plurality of processing SEMs connected in a network in a multidrop configuration with the at least one connecting SEM, the plurality of processing SEMs configured to receive and transmit the subsea related data on the at least one high speed communications conduit through the at least one connecting SEM and the network in the multidrop configuration;
   wherein the receiving and transmitting on the at least one high speed communications conduit is in compliance with at least one of: the IEEE 1901 and the ITU-T G.hn standard as at the effective date of filing of this patent; and
   wherein the one or more connecting SEMs provides a multidrop link to each of the processing SEMs, without requiring direct connection of each processing SEM to a central distribution unit.

2. The subsea control system of claim 1, wherein the plurality of processing SEMs are configured in a topography selected from one of: a star topography, a tree topography, and a ring topography.

3. The subsea control system of claim 1, wherein the at least one connecting SEM and the plurality of processing SEMs comprise A/B redundancy, such that a B redundancy system is configured to operate in the presence of a failure of an A redundancy system.

4. The subsea control system of claim 1, wherein the subsea control system comprises a Christmas tree for sealing a subsea well and wherein at least some of the plurality of processing SEMs form part of the Christmas tree.

5. The subsea control system of claim 1, wherein the at least one connecting SEM and the plurality of processing SEMs receive and transmit the subsea related data on dedicated communication wires or power lines.

6. The subsea control system of claim 1, wherein at least one of the processing SEMs comprises an end device.

7. The subsea control system of claim 6, wherein the end device is selected from at least one of: an actuator and an instrument.

8. The at least one connecting and processing SEM of the subsea control system of claim 1, wherein the at least one connecting SEM further comprises an IEEE1901 or ITU-T G.hn standard compliant interface configured to receive and transmit the subsea related data.

9. The subsea control system of claim 1 comprised in at least one of: a subsea oil and gas production system; and a subsea oil and gas processing system.

10. The subsea control system of claim 1, wherein the at least one high speed communications conduit is in compliance with at least one of: Homeplug AV R1.0/2.0 or Green-Phy.

11. A method for transmitting and receiving subsea related data to and from a surface control system and a subsea control system, the method comprising:
    receiving and transmitting, in at least one connecting Subsea Electronic Module, SEM, the subsea related data via at least one high speed communications conduit; and
    transmitting and receiving, to and from, respectively, a plurality of processing SEMs connected in a network in a multidrop configuration with the at least one connecting SEM, the subsea related data;
    wherein the receiving and transmitting on the at least one high speed communications conduit is in compliance with at least one of: a IEEE 1901 standard, and a ITU-T G.hn standard as at the effective date of filing of this patent; and
    wherein the one or more connecting SEMs provides a multidrop link to each of the processing SEMs, without requiring direct connection of each processing SEM to a central distribution unit.

12. The method of claim 11, wherein the transmitting and receiving further comprises transmitting and receiving the subsea related data to and from, respectively, the plurality of processing SEMs configured in a topography selected from one of: a star topography, a tree topography, and a ring topography.

13. The method of claim 11, wherein the at least one connecting SEM and the plurality of processing SEMs comprise A/B redundancy, such that a B redundancy system is configured to operate in the presence of a failure of an A redundancy system.

14. The method of claim 11, wherein the subsea control system comprises a Christmas tree for sealing a subsea well and wherein at least some of the plurality of processing SEMs form part of the Christmas tree.

15. The method of claim 11, wherein the receiving and transmitting of the subsea related data is provided on dedicated communication wires or power lines.

16. The method of claim 11, wherein at least one of the processing SEMs comprises an end device.

17. The method of claim 16, wherein the end device is selected from at least one of: an actuator and an instrument.

18. A computer readable medium comprising executable instructions such that when executed by subsea control system provide for transmitting and receiving subsea related data to and from a surface control system, the instructions comprising:
    receiving and transmitting, in at least one connecting Subsea Electronic Module, SEM, the subsea related data via at least one high speed communications conduit; and
    transmitting and receiving, to and from, respectively, a plurality of processing SEMs connected in a network in a multidrop configuration with the at least one connecting SEM, the subsea related data;
    wherein the receiving and transmitting on the at least one high speed communications conduit is in compliance with at least one of: a IEEE 1901 standard; and a ITU-T G.hn standard as at the effective date of filing of this patent; and
    wherein the one or more connecting SEMs provides a multidrop link to each of the processing SEMs, without requiring direct connection of each processing SEM to a central distribution unit.

19. The computer readable medium of claim 18, wherein the instructions further comprise transmitting the subsea related data to the plurality of processing SEMs configured in a topography selected from one of: a star topography, a tree topography, and a ring topography.

20. The computer readable medium of claim 18, wherein the instructions further comprise receiving and transmitting of the subsea related data is provided on dedicated communication wires or power lines.

21. The method of claim 11, wherein the method comprises allowing at least one of the plurality of processing SEMs to be connected in the network in the multidrop configuration indirectly with the at least one connecting SEM.

22. A subsea control system for transmitting and receiving subsea related data to and from a topside control system, the subsea control system comprising:

at least one connecting Subsea Electronic Module, SEM, in connection with at least one high speed communications conduit, wherein the at least one connecting SEM is configured to receive and transmit the subsea related data to and from the topside control system via the at least one high speed communications conduit; and a plurality of processing SEMs connected in a network in a multidrop configuration with the at least one connecting SEM, the plurality of processing SEMs configured to receive and transmit the subsea related data on the at least one high speed communications conduit through the at least one connecting SEM and the network in the multidrop configuration;

wherein the receiving and transmitting on the at least one high speed communications conduit is in compliance with at least one of: the IEEE 1901 and the ITU-T G.hn standard as at the effective date of filing of this patent; and wherein at least one of the plurality of processing SEMs is connectable indirectly to the at least one connecting SEM.

\* \* \* \* \*